UNITED STATES PATENT OFFICE.

LEOPOLD SARASON, OF BERLIN, GERMANY, ASSIGNOR TO C. F. BOEHRINGER & SOEHNE, OF MANNHEIM-WALDHOF, BADEN, GERMANY, A FIRM.

MILK-PRESERVE AND PROCESS OF MAKING SAME.

No. 809,138.     Specification of Letters Patent.     Patented Jan. 2, 1906.

Application filed March 13, 1905. Serial No. 249,818.

*To all whom it may concern:*

Be it known that I, LEOPOLD SARASON, a citizen of Prussia, residing at O. Raupachstrasse 12, Berlin, Germany, have invented certain new and useful Improvements in Milk-Preserves and Processes of Making Same; and I do hereby declare the following to be a full, clear, and exact description of the invention, such as will enable others skilled in the art to which it appertains to make and use the same.

The therapeutic importance of buttermilk in cases of disorders of the bowels in children is universally recognized by scientific authorities on infant complaints. On the other hand, it is an established fact that only so-called "good" buttermilk—*i. e.*, a fresh milk—possesses this curative power, whereas an inferior product does more harm than good. The action of buttermilk appears to be of a specific character. Although it is not as yet established to what constituent this action is due, the opinion of the majority leans toward the supposition that the lactic acid is the effective specific reagent. According to my opinion there is no doubt that lactic acid also plays a considerable part; but I am convinced that the introduction of living lactic-acid germs into the intestinal canal is of far greater importance. The lactic-acid germs (*bacilli lactici*) which have opportunity of multiplying in the digestive organs of the sick child overwhelm and exterminate other pernicious germs therein. A great obstacle to the application of this excellent therapeutic agent has hitherto lain in the difficulty of obtaining at all times and places a reliable buttermilk of unvarying quality. I have found that it is possible to overcome this difficulty by the preparation of a preserve which is of unvarying quality, will keep very well, and being mixed with water yields at all times a fresh buttermilk.

The object of my process consists in obtaining by evaporation a milk-preserve without destroying the therapeutically-active constituents—viz., the living lactic-acid germs. In order to prepare such a preserve, which should possess the original biological attributes of buttermilk, it was necessary to consider and make allowance for the vital conditions of lactic-acid germs. As the *bacilli lactici* are strongly affected by heating to a temperature of 60° centigrade, my process consists in evaporating the milk under such conditions that the temperature does not exceed 60° centigrade. In general, it is advisable not to exceed 53° centigrade.

As starting material for my process any milk which contains living lactic-acid germs may be used. It is immaterial whether I start from sterilized full-milk, skim-milk, or cream which have been subjected to a lactic-acid fermentation by the introduction of a pure cultivation of lactic-acid germs or whether I take a fresh and carefully-selected buttermilk. In the latter case one also obtains a preserve free of pathogenic germs, inasmuch as at a temperature of 50° to 60° centigrade all pathogenic and putrefactive germs, such as occur in milk, are destroyed within a few hours in presence of *bacilli lactici*.

It is frequently advantageous in carrying out my invention to add during any step in the process of preparation desirable nutritive and digestive components, such as flour, yolk of egg, albumen, sugar, pepsin, &c.

The following examples will elucidate the mode of carrying out my invention:

*Example 1—Preparation of the preserve from sterilized milk.*—One hundred liters sterilized or pasteurized milk are mixed with six liters of a milky suspension containing a pure cultivation of *bacilli lactici* and the whole allowed to stand at a temperature of 38° centigrade until an acidity of about 0.5 to one per cent. is attained. The mass is then introduced into a suitable vacuum-evaporator, where it is stirred and evaporated to dryness, the temperature being kept at 53° centigrade. The product is then ground to the consistency of a fine powder. The preserve obtained in this way is of a whitish-yellow color and of pleasant and slightly-acid flavor.

*Example 2—Preparation of the preserve from buttermilk.*—Fresh buttermilk is introduced into a suitable vacuum-evaporator and evaporated to dryness at a temperature of about 53° centigrade. The resulting product is treated as above and has similar properties to that obtained according to Example 1.

*Example 3—Preparation from milk or buttermilk of a preserve containing additional compounds.*—The process is carried out according to Example 1 or Example 2. Before or after evaporation such a quantity of flour and sugar is added that one kilogram of the dried preserve contains about five hundred and fifty grams of the milk-powder, about one hundred grams of flour, and about three hundred and fifty grams of sugar.

What I claim, and wish to secure by Letters Patent of the United States, is—

1. The process of preparing a milk-preserve, which consists in evaporating, at a temperature not exceeding 60° centigrade, a milk containing a substantial amount of living lactic-acid germs.

2. The process of preparing a milk-preserve, which consists in preparing a milk containing a substantial amount of living lactic-acid germs, and then evaporating said milk at a temperature not exceeding 60° centigrade.

3. The process of preparing a milk-preserve, which consists in evaporating, in a vacuum, at a temperature not exceeding 60° centigrade, a milk containing a substantial amount of living lactic-acid germs.

4. The process of preparing a milk-preserve, which consists in evaporating a milk containing a substantial amount of living lactic-acid germs, in a vacuum, at a temperature not exceeding 60° centigrade, while keeping the mass in motion.

5. The process of preparing a milk-preserve, which consists in evaporating to dryness, at a temperature not exceeding 60° centigrade, a milk containing a substantial amount of living lactic-acid germs.

6. The process of preparing a milk-preserve, which consists in evaporating to dryness, at a temperature not exceeding 60° centigrade, a milk containing a substantial amount of living lactic-acid germs, and then grinding the resultant product.

7. The process of preparing a milk-preserve, which consists in preparing a milk containing a substantial amount of living lactic-acid germs, and then evaporating said milk to dryness at a temperature of about 53° centigrade.

8. The process of preparing a milk-preserve, which consists in preparing a milk containing a substantial amount of living lactic-acid germs, then evaporating said milk to dryness at about 53° centigrade, and grinding the resultant product to a fine powder.

9. As a new article of manufacture, a milk-preserve in the form of a powder, containing living lactic-acid germs and the non-aqueous constituents of the milk from which it is obtained and having an agreeable and slightly-acid flavor.

10. As a new article of manufacture, a milk-preserve, in the form of a powder containing living lactic-acid germs and the non-aqueous constituents of buttermilk and having an agreeable and slightly-acid flavor.

In testimony whereof I affix my signature in presence of two witnesses.

LEOPOLD SARASON.

Witnesses:
 LEOPOLD MATTAUSCH,
 ANTON HASSLER.